US010195819B1

(12) United States Patent
Donnelly

(10) Patent No.: US 10,195,819 B1
(45) Date of Patent: Feb. 5, 2019

(54) MULTILAYER CERAMIC COMPOSITE AND METHOD OF PRODUCTION

(71) Applicant: Fred D Donnelly, Santa Fe Springs, CA (US)

(72) Inventor: Fred D Donnelly, Santa Fe Springs, CA (US)

(*) Notice: Subject to any disclaimer, the term of this patent is extended or adjusted under 35 U.S.C. 154(b) by 210 days.

(21) Appl. No.: 15/423,402

(22) Filed: Feb. 2, 2017

Related U.S. Application Data

(60) Provisional application No. 62/290,020, filed on Feb. 2, 2016.

(51) Int. Cl.
| | |
|---|---|
| *B32B 5/26* | (2006.01) |
| *B32B 1/08* | (2006.01) |
| *B32B 5/02* | (2006.01) |
| *B32B 37/18* | (2006.01) |
| *B29C 70/02* | (2006.01) |

(Continued)

(52) U.S. Cl.
CPC .............. *B32B 5/26* (2013.01); *B29C 70/028* (2013.01); *B32B 1/08* (2013.01); *B32B 5/022* (2013.01); *B32B 5/024* (2013.01); *B32B 37/18* (2013.01); *B29K 2061/00* (2013.01); *B29K 2709/02* (2013.01); *B29K 2709/08* (2013.01); *B29K 2713/00* (2013.01); *B29K 2995/0016* (2013.01); *B29L 2031/3076* (2013.01); *B32B 2250/20* (2013.01); *B32B 2250/40* (2013.01); *B32B 2260/023* (2013.01); *B32B 2260/046* (2013.01); *B32B 2262/101* (2013.01); *B32B 2262/105* (2013.01); *B32B 2307/3065* (2013.01);

(Continued)

(58) Field of Classification Search
CPC .. B32B 5/26; B32B 1/08; B32B 5/022; B32B 5/024; B32B 37/18; B32B 2250/20; B32B 2250/40; B32B 2260/023; B32B 2260/046; B32B 2605/18; B32B 2262/101; B32B 2262/105; B32B 2315/08; B32B 2315/02; B32B 2307/3065; B29C 70/028; B29K 2995/0016; B29K 2709/08; B29K 2709/02; B29K 2061/00; B29K 2713/00; B29L 2031/3076

See application file for complete search history.

(56) References Cited

U.S. PATENT DOCUMENTS

| | | | |
|---|---|---|---|
| 4,767,656 | A | 8/1988 | Chee et al. |
| 5,092,948 | A | 3/1992 | Lange et al. |

(Continued)

OTHER PUBLICATIONS

Authors: Manfredi, Alvarez and Rodriguez; Title: Development High Temperature Resistant Material Using Carbon/Phenolic Prepregs With Nanoclays. Symposium: The 19th International Conference on Composite Materials; Publisher; Unknown.

*Primary Examiner* — Michael C Miggins
(74) *Attorney, Agent, or Firm* — Eric Karich; Karich & Associates

(57) ABSTRACT

An aircraft part has a multilayer ceramic composite that includes an inner skin, a ceramic insulation core, and an outer skin. The inner skin includes a plurality of layers of fiberglass impregnated with a thermoset resin. The ceramic insulation core is sufficiently flame resistant to prevent penetration of a flame with a temperature of about 2000 degrees F. for at least 15 minutes when the aircraft part is directly exposed to the flame. The outer skin includes a plurality of layers of fiberglass impregnated with a thermoset resin. The multilayer ceramic composite is manufactured using a novel method that provides superior performance at a reduced cost.

12 Claims, 2 Drawing Sheets

(51) Int. Cl.
   *B29K 709/08*    (2006.01)
   *B29K 709/02*    (2006.01)
   *B29K 61/00*     (2006.01)
   *B29L 31/30*     (2006.01)

(52) U.S. Cl.
   CPC ....... *B32B 2315/02* (2013.01); *B32B 2315/08* (2013.01); *B32B 2605/18* (2013.01)

(56) References Cited

U.S. PATENT DOCUMENTS

| | | |
|---|---|---|
| 5,260,125 A | 11/1993 | Copes |
| 5,308,421 A | 5/1994 | Gronczy et al. |
| 5,545,435 A | 8/1996 | Steffier |
| 5,632,834 A | 5/1997 | Ostertag |
| 6,489,001 B1 | 12/2002 | Cazzato et al. |
| 6,759,117 B2 | 7/2004 | Bauer |
| 2011/0232826 A1 | 9/2011 | Hara et al. |

MULTILAYER CERAMIC COMPOSITE AND METHOD OF PRODUCTION

CROSS-REFERENCE TO RELATED APPLICATIONS

This application for a utility patent claims the benefit of U.S. Provisional Application No. 62/290,020, filed Feb. 2, 2016.

BACKGROUND OF THE INVENTION

Field of the Invention

This invention relates generally to composite materials, and more particularly to a multilayer ceramic composite for use in non-structural aircraft parts.

Description of Related Art

In general, the use of reinforced phenolic prepreg materials with composites is known for fire-proof or fire-resistant applications. Many aircraft parts, in particular, are constructed of reinforced phenolic prepreg materials because of their known fire resistance. This is discussed in various articles, including *Development High Temperature Resistant Materials Using Carbon/Phenolic Prepregs With Nanoclays*, by L. Asaro and L. B. Manfredi, published as part of the 19$^{th}$ International Conference on Composite Materials.

Aircraft parts constructed of phenolic resin and glass or carbon prepreg fibers must currently be fitted with metal parts and exterior ceramic "blankets" to enable the parts to meet stringent government regulations required for aircraft parts. These additional components and blankets significantly increase the cost and weight of the parts, and show a long-felt need in the industry for a composite material that can meet government fireproof regulations without the addition of these added parts and ceramic blankets.

There are some prior art materials that are able to meet the stringent requirements without the addition of the added metal parts and ceramic blankets; however, these parts are extremely expensive, and require treatment in an autoclave for long periods under very high pressure. This expense makes them not generally commercially viable for common aircraft parts, outside of special programs (e.g., space shuttle components). Examples include the following:

Cazzato, U.S. Pat. No. 6,489,001, teaches a thermally insulating material that includes a ceramic tile in conjunction with a prepreg fiber. The product requires a pyrolytic curing process that requires high heat (500-1400 degrees Fahrenheit) and high pressure (i.e., autoclave conditions). The part is impact resistant as well as thermally insulating; however, it is also extremely expensive and cannot be easily contoured to fit a mold. While useful as a tile in the space shuttle, it is too expensive for general use. Similar materials are shown in Ostertag, U.S. Pat. No. 5,632,834, and Gonczy, U.S. Pat. No. 5,308,421.

Lange, U.S. Pat. No. 5,092,948, teaches a fiber reinforced laminated ceramic composite that includes layers of strong flexible fibers (graphite, Kevlar) and rigid ceramic plates. Not only are the parts rigid and non-moldable, they are also expensive, both due to the method of production (125 psi pressure required during curing), but also due to the expensive fibers required. Chee, U.S. Pat. No. 4,767,656, teaches a similar product that required very expensive fibers, such as Nextel and Kevlar.

The prior art also includes several other references of interest, including the following: Hara, U.S. 2011/0232826 (ultrasonic welding of ceramic/resin composite); Copes, U.S. Pat. No. 5,260,125 (ceramic composite of alumina-borosilicate fibers); Steffier, U.S. Pat. No. 5,545,435 (fiber-reinforced ceramic-matrix composite); and Bauer, U.S. Pat. No. 6,759,117 (multilayer ceramic composite). The above-described references are hereby incorporated by reference in full.

The prior art teaches the manufacture of expensive, "structural" (impact resistant) aircraft components that include phenolic prepreg materials and ceramics, manufactured using an expensive process that requires treatment for long periods in a high pressure autoclave. However, the prior art does not teach a ceramic composite material that may be used in the production of non-structural aircraft parts without an autoclave, at a significantly lower cost than prior art products. The present invention fulfills these needs and provides further advantages as described in the following summary.

SUMMARY OF THE INVENTION

The present invention teaches certain benefits in construction and use which give rise to the objectives described below.

The present invention provides an aircraft part with integral thermal and flame protection, the aircraft part comprising an inner skin, a ceramic insulation core, and an outer skin. The inner skin includes a plurality of layers of fiberglass impregnated with a thermoset resin. The ceramic insulation core is sufficiently flame resistant to prevent penetration of a flame with a temperature of about 2000 degrees F. for at least 15 minutes when the aircraft part is directly exposed to the flame. The outer skin includes a plurality of layers of fiberglass impregnated with a thermoset resin.

In one embodiment, the inner skin and the outer skin each comprise at least three layers of a continuously woven 8-harness satin e-glass, each saturated with a phenolic resin. In this embodiment, the ceramic insulation core comprises at least two layers of a non-woven alumina-silicate fiber.

In another embodiment, the invention includes a method of manufacturing an aircraft component that utilizes a mold of the aircraft part to form the component. An inner skin is formed by applying a plurality of layers of fiberglass impregnated with a thermoset resin on the mold. The inner skin is covered with a ceramic insulation core, and an outer skin is formed over the ceramic insulation core by applying a plurality of layers of fiberglass impregnated with a thermoset resin. The mold and its contents are then placed in a vacuum bag, and air is removed so that approximately one atmosphere of pressure is applied to the contents of the vacuum bag. The component is then placed in a non-pressurized curing oven, and baked at about 250-300 degrees F. in accordance with the cure rate schedule to cure the multilayer ceramic composite.

A primary objective of the present invention is to provide an aircraft part that is constructed of a multilayer ceramic composite having advantages not taught by the prior art.

Another objective is to provide a multilayer ceramic composite that is sufficiently flame resistant to prevent penetration of a flame with a temperature of about 2000 degrees F. for at least 15 minutes when the aircraft part is directly exposed to the flame.

A further objective is to provide a multilayer ceramic composite that may be baked at a relatively low temperature, and at low pressure without requiring a high pressure autoclave, to form an aircraft component at a commercially acceptable price.

A further objective is to provide a method of manufacturing an aircraft part that meets the requirements of the FAA's AC20-135 and EASA's version of the Fire Test Requirements for commercial aircraft, without requiring extremely expensive processing steps that drive the cost of the part beyond commercial acceptance.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings.

DETAILED DESCRIPTION OF THE INVENTION

The above-described drawing figures illustrate the invention, a multilayer ceramic composite and method of manufacturing a non-structural aircraft part using the composite.

Figure 1:
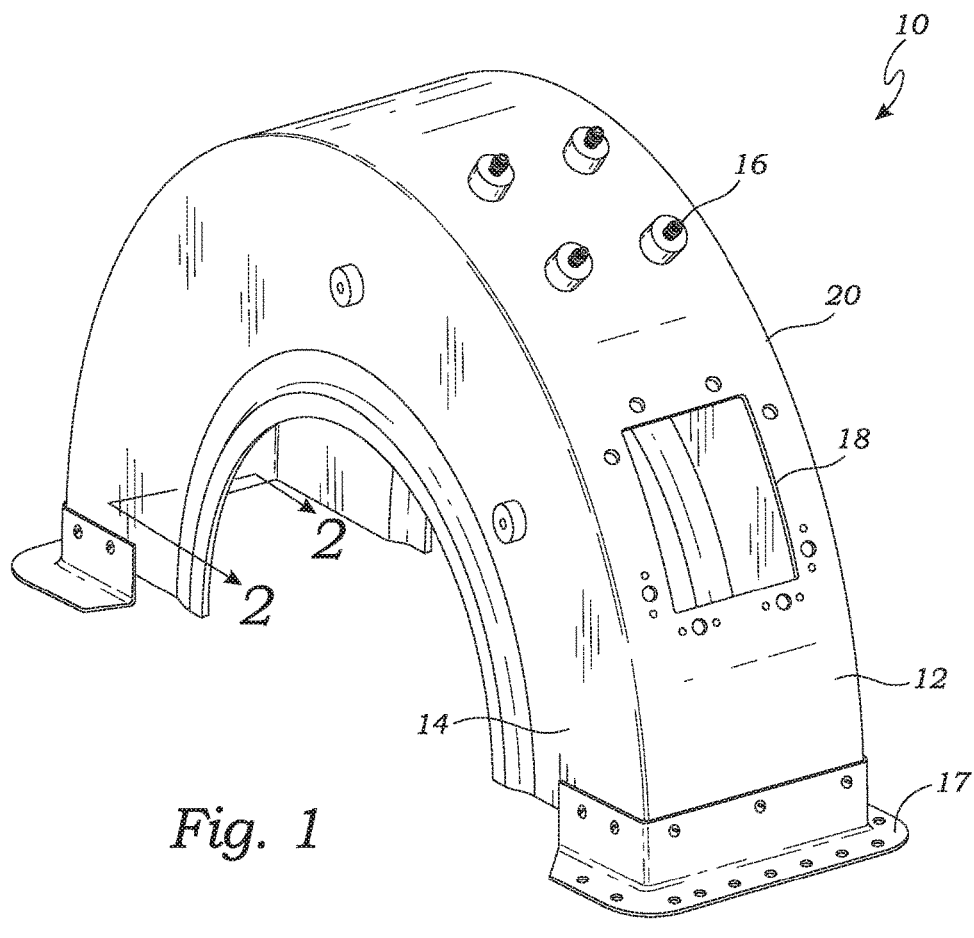
FIG. 1 is a perspective view of a non-structural aircraft part, in this case a plenum component, that is manufactured using a multilayer ceramic composite according to one embodiment of the present invention.

FIG. 1 is a perspective view of one embodiment of the non-structural aircraft part 10 that is manufactured using the multilayer ceramic composite 20. As shown in FIG. 1, the multilayer ceramic composite is particularly useful in the construction of non-structural aircraft parts, such as a plenum component. The plenum component may include a generally annular construction (or, in this case, a portion of such an annular construction) that includes an outer rim 12 and an inwardly extending flange 14. Fittings 16 may be installed on the plenum component for operative interconnection with an auxiliary power unit ("APU") of an aircraft (not shown), and mounting elements 17 may be used for mounting the plenum component, or, in this case, for connecting a second plenum component (not shown). The plenum component may also include apertures 18 and similar cutouts for directing air flow. The plenum component may be installed around an engine (not shown) for directing air flow, as is known in the art. While a plenum component is illustrated herein, alternative non-structural aircraft parts (e.g., ducting, etc.) may also be constructed using the teachings of the present invention.

Figure 2:
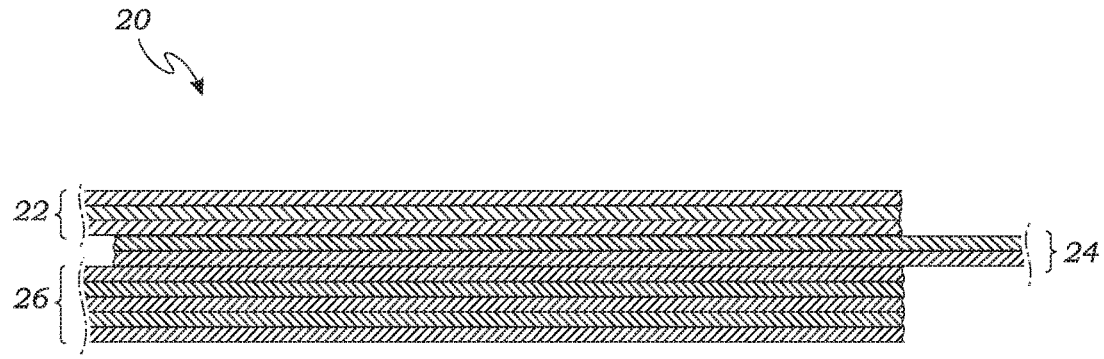
FIG. 2 is a sectional view of the multilayer ceramic composite taken along line 2-2 in FIG. 1.

FIG. 2 is a sectional view of the multilayer ceramic composite 20 taken along line 2-2 in FIG. 1. As shown in FIG. 2, the multilayer ceramic composite includes an inner skin 22 and an outer skin 26 that are both constructed of fiber reinforcement saturated (wet out) with a thermoset resin. The inner and outer skins surround and sandwich a ceramic insulation core. 24.

In one embodiment, the inner skin and the outer skin are constructed of a continuously woven 8-harness satin e-glass, and is saturated with a phenolic resin (e.g., a fiberglass phenolic prepreg). While these embodiments are provided to illustrate the present invention, those skilled in the art may select similar or equivalent materials consistent with the teachings of the present invention, and such similar or equivalent materials should be considered within the scope of the present invention.

In this embodiment, the ceramic insulation core includes a non-woven alumina-silicate fiber that is flexible and capable of being formed in or around a suitable mold. In alternative embodiments, alternative insulating materials may be used, so long as they provide the necessary insulation at an acceptable cost. Equivalent insulation materials should be considered within the scope of the present invention.

In the embodiment of FIG. 2, during production, multiple layers of fiberglass phenolic prepreg are stacked together to form the inner skin. In this case, six layers are used, although the specific number of layers may be varied depending upon the particular requirements of each product. Then, the ceramic insulation core is disposed on the inner skin. In this embodiment, one or more layers of alumina-silicate fiber are stacked together, and may be held in place with an adhesive. This ceramic insulation core comprises a flexible non-woven material, so that the material may be formed in mold into the non-structural aircraft part (such as shown in FIG. 1).

Finally, multiple layers of fiberglass phenolic prepreg are stacked together to form the outer skin, to form the multilayer ceramic composite. In this case, three layers are used; although, as noted before, the specific number of layers may be varied depending upon the particular requirements of each product. This process may obviously be performed in different orders, or using equivalent techniques known in the art, and such alternatives should be considered within the scope of the present invention.

In this embodiment, the overall cured phenolic and insulation material is about 3/16 inch thick. The ceramic insulation core should be thick enough to prevent a 2000 degree F. flame applied from the exterior side of the multilayer ceramic composite from raising the temperature on the opposite side to beyond 250 degrees F. The described ceramic insulation core has been found to keep the temperature on the non-burning side of the multilayer ceramic composite around or below 220 degrees F. By keeping the temperature on the non-burning side to 250 degrees F. or lower, this prevents any volatiles in the prepreg materials on the non-burning side from "flashing" or igniting for a short period (and thus failing to meet government safety requirements).

Figure 3:
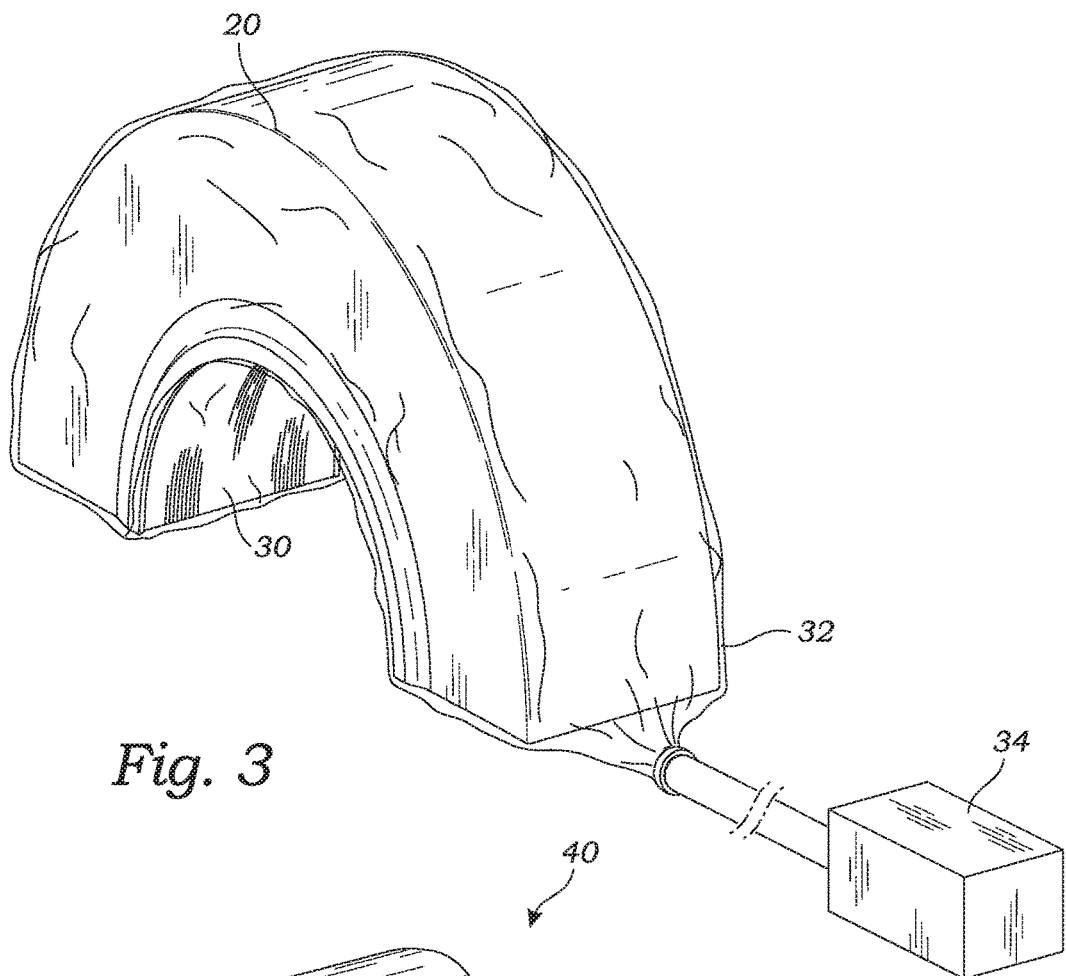
FIG. 3 is a perspective view of a mold over which the multilayer ceramic composite has been spread, the mold having been placed in a vacuum bag prior to curing.

FIG. 3 is a perspective view a mold 30 over which the multilayer ceramic composite 20 has been spread during production of the non-structural aircraft part 10 (of FIG. 1). The mold and multilayer ceramic composite are also shown having been placed in a vacuum bag 32 prior to curing. As shown in FIG. 3, the multilayer ceramic composite is flexible enough to be spread or otherwise positioned over or within the mold so as to form the correct shape. The mold is placed in the vacuum bag, which is operatively connected to a vacuum pump 34. Once air has been evacuated from the vacuum bag, the multilayer ceramic composite is subjected to a low pressure (14 to 14.5 psi) by the atmosphere, without any additional pressure being required from another source, such as an autoclave. The mold may then be placed in a curing oven (autoclave not required) at about 250-300 degrees F. and cured in accordance with the cure rate schedule to cure the multilayer ceramic composite.

This process enables the inexpensive production of the plenum component with a complex non-geometric shape, without the need for complicated and expensive specialty molds or tooling, or an autoclave. This combination of materials and process has been demonstrated to produce a component which will meet the requirements of the FAA's AC20-135 and EASA's version of the Fire Test Requirements for commercial aircraft. The multilayer ceramic composite further does not require expensive carbon fiber material, or other expensive reinforcement materials such as Nextel, Kevlar, etc., to be fireproof.

Once cured, the multilayer ceramic composite may be removed from the mold, fabricated in accordance with the customer's requirement, and the fittings and other components added (as shown in FIG. 1). However, a ceramic blanket is not included, and there are no added protective metal components to allow the part to pass flammability tests, as the multilayer ceramic composite is able by itself to pass the required flammability tests.

For purposes of this application, the term "about" is defined to mean +/−10%. This does not preclude alternatives outside of the described ranges, unless specifically required in the claims, and no limitations beyond the claims should be inferred from the embodiments described in the specification.

Figure 4:
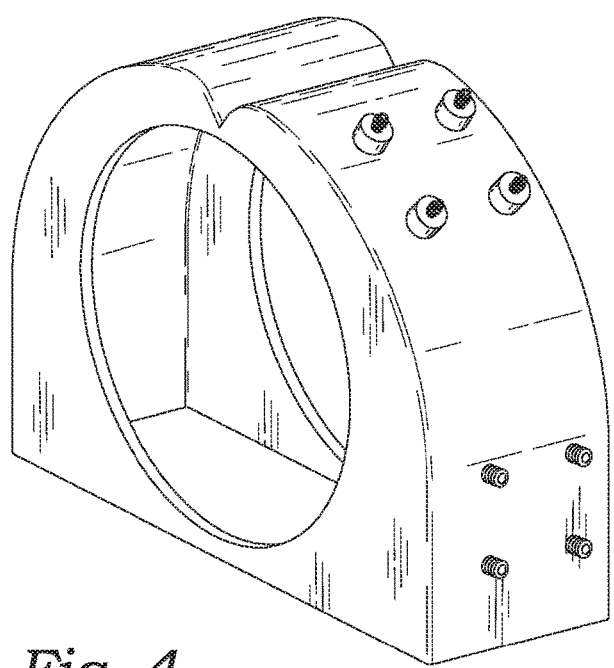
FIG. 4 is a perspective view of another non-structural aircraft part, in this case another embodiment of a plenum.

FIG. 4 is a perspective view of another non-structural aircraft part 40, in this case another embodiment of a plenum. The particular shape of the plenum will vary depending upon the particular engine used, and alternative configurations should be considered within the scope of the present invention. Furthermore, while the plenum illustrates one embodiment of the non-structural aircraft part, other aircraft components known in the art may also utilize the multilayer ceramic composite in their construction, consistent with the teachings on the present invention.

As used in this application, the words "a," "an," and "one" are defined to include one or more of the referenced item unless specifically stated otherwise. Also, the terms "have," "include," "contain," and similar terms are defined to mean "comprising" unless specifically stated otherwise. Furthermore, the terminology used in the specification provided above is hereby defined to include similar and/or equivalent terms, and/or alternative embodiments that would be considered obvious to one skilled in the art given the teachings of the present patent application. While the invention has been described with reference to at least one particular embodiment, it is to be clearly understood that the invention is not limited to these embodiments, but rather the scope of the invention is defined by the following claims.

What is claimed is:

1. An aircraft part with integral thermal and flame protection, the aircraft part comprising:
   an inner skin comprising a plurality of layers of fiberglass impregnated with a thermoset resin;
   a ceramic insulation core that is sufficiently flame resistant to prevent penetration of a flame with a temperature of about 2000 degrees F. for at least 15 minutes when the aircraft part is directly exposed to the flame; and
   an outer skin comprising a plurality of layers of fiberglass impregnated with a thermoset resin.

2. The aircraft part of claim 1, wherein the inner skin comprises a continuously woven 8-harness satin e-glass, and is saturated with a phenolic resin.

3. The aircraft part of claim 1, wherein the outer skin comprises a continuously woven 8-harness satin e-glass, and is saturated with a phenolic resin.

4. The aircraft part of claim 1, wherein the ceramic insulation core comprises a non-woven alumina-silicate fiber.

5. The aircraft part of claim 1, wherein the inner skin comprises at least three layers of a continuously woven 8-harness satin e-glass, each saturated with a phenolic resin; wherein the outer skin comprises at least three layers of a continuously woven 8-harness satin e-glass, each saturated with a phenolic resin; and wherein the ceramic insulation core comprises at least two layers of a non-woven alumina-silicate fiber.

6. The aircraft part of claim 5, wherein the aircraft part is a generally annular component of a plenum.

7. The aircraft part of claim 6, further comprising plenum fittings operably mounted through the annular component.

8. A method for manufacturing an aircraft part, the method comprising the steps of:
   providing a mold of the aircraft part;
   forming an inner skin over the mold by applying a plurality of layers of fiberglass impregnated with a thermoset resin;
   covering the inner skin with a ceramic insulation core;
   forming an outer skin over the ceramic insulation core by applying a plurality of layers of fiberglass impregnated with a thermoset resin;
   positioning the mold and its contents in a vacuum bag;
   pumping air out of the vacuum bag so that approximately one atmosphere of pressure is applied to the contents of the vacuum bag;
   placing the vacuum bag into a non-pressurized curing oven; and
   baking the contents of the vacuum bag at about 250-300 degrees F. in accordance with the cure rate schedule to cure the multilayer ceramic composite.

9. The method of claim 8, wherein the inner skin comprises a continuously woven 8-harness satin e-glass, and is saturated with a phenolic resin.

10. The aircraft part of claim 8, wherein the outer skin comprises a continuously woven 8-harness satin e-glass, and is saturated with a phenolic resin.

11. The aircraft part of claim 8, wherein the ceramic insulation core comprises a non-woven alumina-silicate fiber.

12. The aircraft part of claim 8, wherein the ceramic insulation core is sufficiently flame resistant to prevent penetration of a flame with a temperature of about 2000 degrees F. for at least 15 minutes when the aircraft part is directly exposed to the flame.

* * * * *